United States Patent [19]
Wood et al.

[11] Patent Number: 5,975,587
[45] Date of Patent: Nov. 2, 1999

[54] PLASTIC PIPE REPAIR FITTING AND CONNECTION APPARATUS

[75] Inventors: Timothy F. Wood, Owasso; David E. Bentley, Catoosa; Donald W. Wartluft, Broken Arrow, all of Okla.

[73] Assignee: Continental Industries, Inc., Tulsa, Okla.

[21] Appl. No.: 09/087,072

[22] Filed: May 29, 1998

Related U.S. Application Data

[63] Continuation-in-part of application No. 08/784,499, Jan. 17, 1997, Pat. No. 5,791,698, which is a continuation-in-part of application No. 08/626,024, Apr. 1, 1996, Pat. No. 5,692,785.

[51] Int. Cl.$^6$ ..................................................... F16L 55/18
[52] U.S. Cl. .......................... 285/15; 285/21.1; 285/21.2; 285/31; 285/323; 285/351; 285/369; 285/383; 285/423; 285/915; 156/158; 156/296; 156/304.2; 156/304.6
[58] Field of Search ........................... 285/15, 21.1, 21.2, 285/21.3, 22, 31, 32, 302, 351, 322, 369, 323, 383, 915, 423; 156/158, 296, 358, 304.2, 304.6

[56] References Cited

U.S. PATENT DOCUMENTS

| | | | |
|---|---|---|---|
| 982,836 | 1/1911 | Ley et al. ................................. | 285/302 |
| 1,363,974 | 12/1920 | Heylman ................................. | 285/302 |
| 2,461,828 | 2/1949 | Lomelino ................................. | 285/2 |
| 2,739,829 | 3/1956 | Pedlow et al. ......................... | 285/21.2 |
| 2,785,910 | 3/1957 | Munger ............................... | 285/915 X |
| 3,542,402 | 11/1970 | Coples ................................... | 285/21.1 |
| 3,594,021 | 7/1971 | Williams ................................. | 285/302 |
| 3,826,521 | 7/1974 | Wilhelmsen ......................... | 285/915 X |
| 3,968,195 | 7/1976 | Bishop ................................... | 285/21.1 |
| 4,049,480 | 9/1977 | Kutschke ................................. | 156/94 |
| 4,229,025 | 10/1980 | Volgstadt et al. .................... | 285/323 X |
| 4,386,796 | 6/1983 | Lyall ........................................ | 285/31 |
| 4,565,393 | 1/1986 | Greaves ............................... | 285/302 X |
| 4,687,232 | 8/1987 | Zimmerman ............................. | 285/31 |
| 4,804,209 | 2/1989 | Fischer .................................... | 285/31 |
| 4,810,008 | 3/1989 | Brodie ..................................... | 285/31 |
| 4,836,581 | 6/1989 | Guilloteau ............................... | 285/31 |
| 4,932,686 | 6/1990 | Anderson, Jr. ........................... | 285/24 |
| 4,946,213 | 8/1990 | Guest ....................................... | 285/31 |
| 5,024,469 | 6/1991 | Aitken et al. .......................... | 285/302 |
| 5,082,313 | 1/1992 | Bryant et al. ........................... | 285/15 |
| 5,125,690 | 6/1992 | Taylor et al. ......................... | 285/22 X |
| 5,141,258 | 8/1992 | Stine ........................................ | 285/31 |
| 5,433,482 | 7/1995 | Baddour ................................... | 285/31 |
| 5,509,698 | 4/1996 | Habicht ................................... | 285/302 |
| 5,692,785 | 12/1997 | Watluft et al. ........................ | 285/328 |

*Primary Examiner*—Dave W. Arola
*Attorney, Agent, or Firm*—Head, Johnson & Kachigian

[57] ABSTRACT

A repair fitting is provided for sealably connecting ends of a pipeline, when a damaged section of the pipeline has been removed. In a preferred embodiment, the pipeline ends are connected using the repair fitting with two stab fittings. The repair fitting includes a first and second piston and a first and second cylinder, wherein the first piston is slidable in the first cylinder and the second piston is slidable in the second cylinder. In an alternate embodiment, two fusion joints are used with the repair fitting to sealably connect the ends of the pipeline. A method is provided for making a repair fitting and a method is also provided for repairing a damaged section of a pipeline.

5 Claims, 7 Drawing Sheets

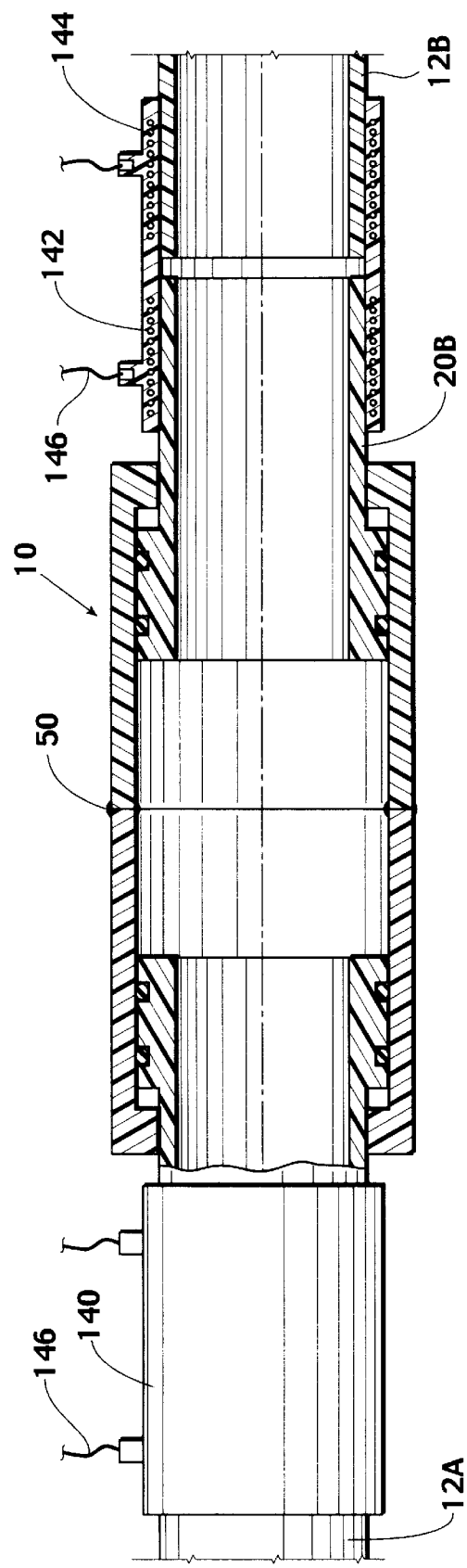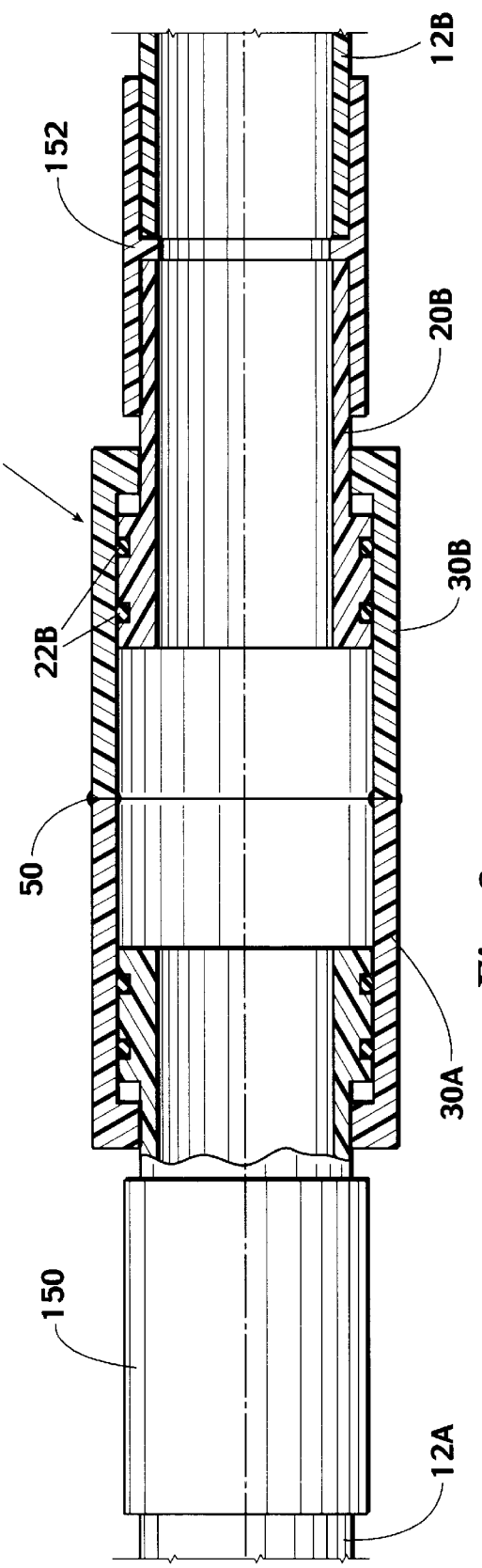

PLASTIC PIPE REPAIR FITTING AND CONNECTION APPARATUS

CROSS-REFERENCE OF RELATED APPLICATION

This application is a continuation-in-part of U.S. patent application entitled PLASTIC PIPE COUPLER WITH INTERNAL SEALER, Ser. No. 08/784,499, filed Jan. 17, 1997, now U.S. Pat. No. 5,791,698, issued Jan. 17, 1997, which is a continuation-in-part of U.S. patent application entitled PLASTIC PIPE COUPLER With INTERNAL SEALER, Ser. No. 08/626,024 filed Apr. 1, 1996, now U.S. Pat. No. 5,692,785, issued Dec. 2, 1997.

BACKGROUND OF THE INVENTION

1. Field of the Invention

The present invention relates to a telescoping repair fitting for repairing and replacing sections of plastic pipe that have been damaged.

2. Description of Related Art

When a plastic pipeline becomes damaged, it is desirable to replace the damaged portion of the pipeline with just enough pipe to repair the portion that is damaged. However, the length of the repair pipe should be adjustable to: (i) account for inexact cutting of the replacement piece of pipe and (ii) allow room to maneuver the pipe repair fitting into place in a small space, such as a pipe trench.

In one type of pipe repair, known as butt fusion, the ends of the pipe are heated as well as the ends of the replacement piece to fuse the joint. The heater may be inserted between the ends. In order to do so, the existing pipes must be axially displaced to make room for the width of the heater. Accordingly, it will be necessary to distort the existing pipeline axially or move the pipeline from its position.

One problem that arises when pipelines are repaired in a small space is that it is difficult or dangerous to work with a heater to form fusion joints. When natural gas is present, ignition from a spark from a heater must be avoided. In such a situation, there are dangers of burning oneself or a coworker or of igniting flammable vapors. For other types of joints, such as chemical solvent joints, there is a danger that the chemicals are respiratory hazards in small spaces. For other joints, such as elastomeric gasket joints or mechanical compression joints, a small space may make working with these joints very cumbersome.

Therefore, there is a need for a repair fitting having a length which may be adjusted to account for inexact measuring and pipe cutting. There is also a need for a repair fitting which may easily be positioned for attachment to pipeline ends. Still further, there is a need for a repair fitting for which any hazardous activities relating to installation of the repair fitting are performed away from a confined space, such as a pipe trench. It is further desired to provide a repair fitting which can easily be attached to pipelines.

An additional problem may arise when cutting an existing plastic pipeline. Because of thermal conditions, the pipeline may be under axial stress. For example, in one type of pipe, it is known that the pipe expands and contracts 1" axially for each 100 feet of pipeline for every 10° F. change. Cutting the pipeline will release the axial stress, causing the pipeline to move axially even while the repair is being made.

There have been other repair fittings for repairing damaged pipeline sections. Lomelino (U.S. Pat. No. 2,461,828) discloses an extension joint which is telescopically adjustable to sealably connect pipeline ends.

Lyall et al. (U.S. Pat. No. 4,386,796) discloses a telescoping repair fitting having a hollow piston within. A plurality of O-rings surround the piston. One end of the piston is connected to a pipe end while the fitting has a shoulder to receive the other pipe end.

Williams (U.S. Pat. No. 3,594,021) discloses an expansion joint having a transparent first or barrel sleeve in which is telescoped a piston or second sleeve. A pair of O-rings around the piston sleeve provide a seal.

Kutschke (U.S. Pat. No. 4,049,480) discloses a method and apparatus for connecting a pair of abutting pipe sections. The pipe ends are attached together by applying tape around a circumference, a sleeve is moved to position overlapping the section intersection, and the annular space closed by gaskets and tape. A settable polyurethane foam is injected into the annular space.

Zimmerman (U.S. Pat. No. 4,687,232) discloses a pipe coupling having a joint housing which may be rotated or may be moved longitudinally. A piston pipe moves longitudinally in the housing with a seal between O-ring and piston wall of the joint housing.

Guilloteau (U.S. Pat. No. 4,836,581) discloses an adaptable length joint with a flange on each pipe having a spherical bearing surface.

Anderson, Jr. (U.S. Pat. No. 4,932,686) discloses a telescoping connector having a first tubular member allowing axial movement and a threaded connection.

Bryant et al. (U.S. Pat. No. 5,082,313) discloses an expansion joint telescoping members having outside threaded ends.

For additional background information concerning plastic pipe fittings, reference may be had to the following previously issued United States patents:

| U.S. Pat. No. | INVENTOR(S) | TITLE |
| --- | --- | --- |
| 4,804,209 | Fischer | PLUMMER'S UNION |
| 4,810,008 | Brodie | METHOD AND APPARATUS FOR REPAIRING LAWN SPRINKLER SYSTEMS |
| 4,946,213 | Guest | TUBE COUPLINGS |
| 5,024,469 | Aitken et al. | ADJUSTABLE LENGTH PIPING UNION |
| 5,082,313 | Stine | EXPANSION JOINT FOR CONDUIT FOR CABLES |
| 5,442,482 | Baddour | WELDLESS PIPE REPAIR APPARATUS AND METHOD |
| 5,509,698 | Habicht | AXIALLY EXTENDIBLE CONDUIT |
| 5,692,785 | Wartluft et al. | PLASTIC PIPE COUPLER WITH INTERNAL SEALER |

SUMMARY OF THE INVENTION

A telescoping repair fitting and connection apparatus is provided for installation between two ends of a plastic pipeline. The repair fitting is used to replace a damaged section of pipeline. The repair fitting may be assembled away from the pipeline, such as in a shop, and may be easily transported for installation.

The repair fitting of the present invention is installed in a pipe line where a damaged section has been removed. The telescoping ends of the repair fitting are extended after positioning of the repair fitting such that the ends of the repair fitting may be coupled or joined with the pipeline ends.

The repair fitting has two pistons contained in two cylinders. Top rims of the cylinders are sealably connected together by a fusion joint, forming a volume between two piston heads. In an alternative embodiment, the cylinders' top rims are sealably connected by sliding the cylinders into a hub, and then gluing inner walls of the hub to outer walls of the cylinder, again forming a volume between the two piston heads.

This volume is sealed by resilient O-rings which seal gaps between the piston heads and cylinder walls. The piston heads slide in the cylinder to allow adjustment of lengths of piston extension ends which protrude from cylinder bottom openings.

Each end of the piston extension ends are sealably connected to pipeline ends using: (1) in the preferred embodiment, two stab fittings; or (2) two fusion joints.

The invention is also for two different methods. The first method is for making the repair fitting described above. The second method is for repairing a damaged portion of a plastic pipeline.

All materials used in the repair fitting, except the O-rings, may be made from plastic.

Thus, one object of the invention is to provide a repair fitting with a length which may be adjusted to account for inexact measuring and pipe cutting.

Another object of the present invention is to provide a repair fitting that will accommodate movement in the pipeline both during installation and thereafter that will result from thermal expansion and contraction.

Another object of the invention is to provide a repair fitting that will allow the repair to be made without axial or vertical movement of the exposed pipeline ends.

Another object of the invention is to provide a repair fitting which may easily be positioned and attached to pipeline ends.

Yet another object of the invention is to provide a repair fitting for which any hazardous activities related to installation of the repair fitting are performed away from a confined space, such as a pipe trench.

BRIEF DESCRIPTION OF THE DRAWINGS

FIG. 7 is a partial cross-sectional elevation view of a plastic pipe repair fitting connected to the pipeline ends by electrofusion joints.

FIG. 8 is a partial cross-sectional elevation view of a pipe repair fitting connected to the pipeline ends by glue joints.

DETAILED DESCRIPTION OF THE PREFERRED EMBODIMENTS

Figure 1:
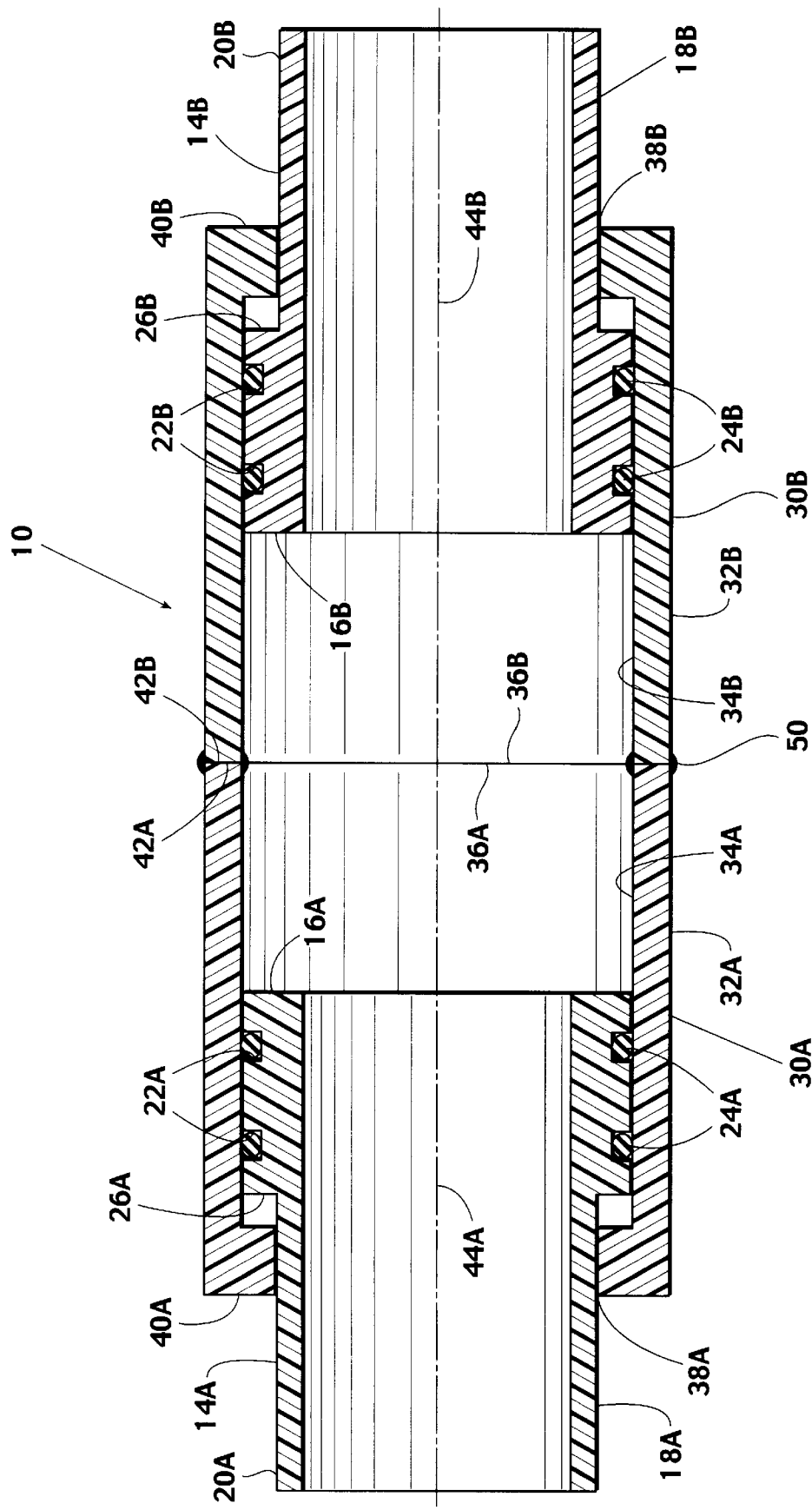
FIG. 1 is a cross-sectional elevational view of a plastic pipe repair fitting constructed according to a preferred embodiment of the present invention.

Referring to the drawings in detail, a telescoping repair fitting 10 is provided for installation between two ends of a plastic pipeline 12A and 12B. The repair fitting 10 itself may be assembled away from the pipeline, such as in a shop, and may be easily transported for installation. The repair fitting 10 is used to replace a damaged section of pipeline. The damaged portion of the pipeline is cut away from the pipeline, forming pipeline ends 12A and 12B.

In one preferred embodiment, the repair fitting 10 is connected to pipeline ends 12A and 12B with two stab fittings 210A and 210B. Stab fittings are couplers designed to be manually inserted onto the end of a length of plastic pipe. One type of preferred stab fittings 210A and 210B are those disclosed by Assignee in U.S. Pat. No. 5,692,785 and pending application Ser. No. 08/784,499 which is incorporated herein by reference.

In another embodiment, a first piston extension end 20A is connected to second pipeline end 12A with one stab fitting 210A. A second piston extension end 16B is connected to a second pipeline end 12B by a fusion joint 60.

In a third embodiment of the invention, both piston extension ends 20A and 20B form a fusion joints 60 with the first and second pipeline ends 12A and 12B, respectively.

In the preferred embodiment shown in FIG. 1, first piston 14A is disposed in first cylinder 30A and second piston 14B is disposed in second cylinder 30B. The repair fitting is produced from two identical cylinders 30A and 30B. Each cylinder includes an open top 36A and 36B, respectively, and a bottom 38A and 38B, respectively, having an opening therethrough. The cylinders 30A and 30B are joined together at their open ends.

There are O-ring grooves 22A and 22B in piston heads 16A and 16B, respectively. Resilient O-rings 24A and 24B are positioned in O-ring grooves 22A and 22B before the piston heads 16A and 16B are moved into the cylinders 30A and 30B. The cylinder inner walls 34A and 34B have the same diameter. The cylinder outer walls 32A and 32B also have the same diameter.

In the first cylinder 30A, the O-rings 24A provide a fluid barrier between: (1) the volume in the cylinder 30A between piston head 16A and top rim 42A, and (2) the volume between piston head 16A and cylinder bottom shoulder 40A. The O-rings 24B provide a similar seal in cylinder 30B. When installed, the O-rings 24A and 24B allow the pistons 14A and 14B to move and still maintain the above-mentioned liquid or gas barrier. After the repair fitting 10 is installed, the piston heads 16A and 16B are not moved.

First cylinder top rim 42A and second cylinder top rim 42B are fused together to form a cylinder-to-cylinder fluid-tight fusion joint 50. The fusion joint may be formed a number of ways. In the butt fusion process, a heating element is brought in contact with the faces of the piston ends. Alternatively, the fusion joint 50 is formed by: (1) butting the top rims 42A and 42B together, such that centerlines 44A and 44B of the cylinders 30A and 30B coincide; and (2) heating the cylinder outer walls 32A and 32B at the intersection of the abutting top rims 42A and 42B. Other types of joints that might be used are mechanical compression joints, elastomeric joints, and chemical solvent joints.

When the cylinders 30A and 30B are fused together, the fluid seal at fusion joint 50 and the liquid and gas barrier provided by the O-rings 24A and 24B prevent any liquid or gas located in the volume between the piston heads 16A and 16B from escaping to the outside environment.

It will be appreciated that the fusion joint 50 also acts as a support rib for the housing of the repair fitting.

On the inside of the housing, the fusion joint 50 also creates a stop or divider for the travel of each piston in the retracted position.

Figure 2:
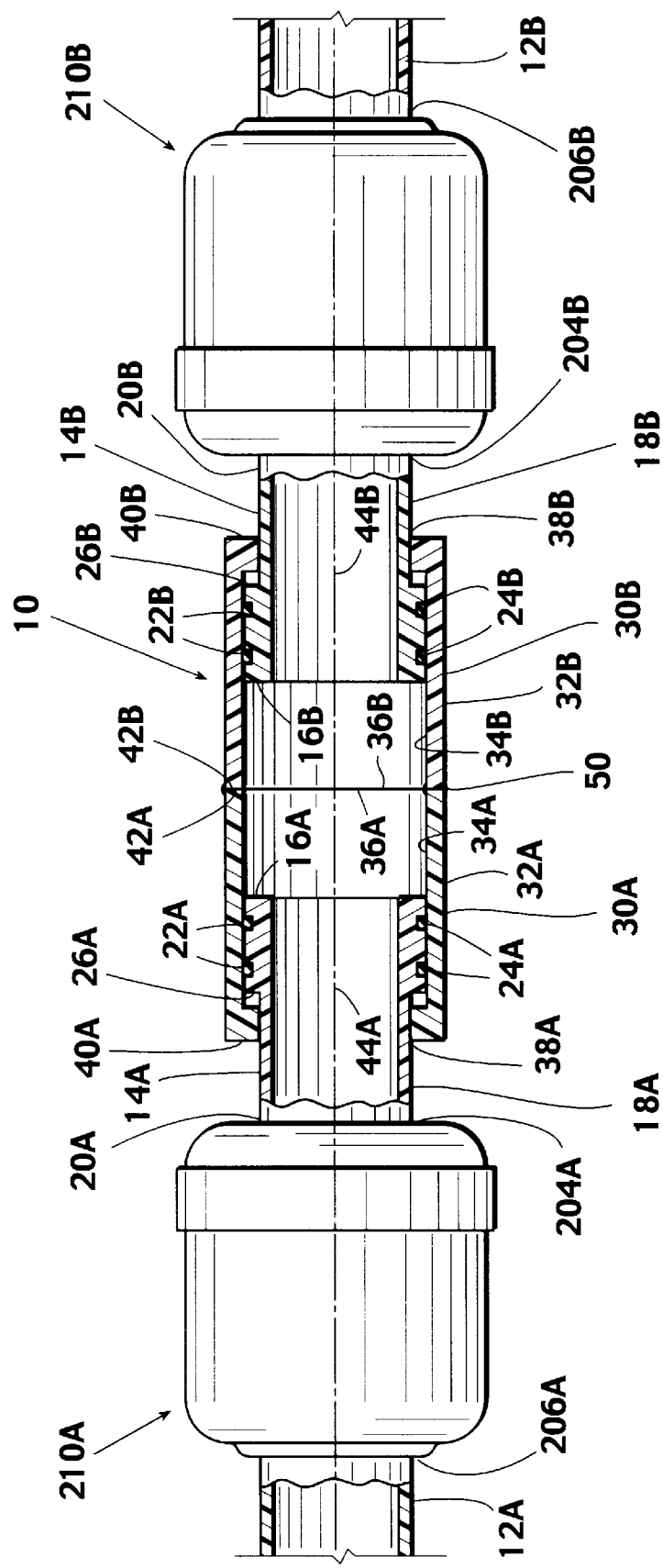
FIG. 2 is a cross-sectional elevational view of the plastic pipe repair fitting shown in FIG. 1, with two stab fittings connecting the repair fitting to pipeline ends.

In the embodiment shown in FIG. 2, piston extension ends 20A and 20B are connected to the pipeline ends 12A and 12B by stab fittings 210A and 210B. The stab fittings provide a fluid-tight, sealed connection between (1) the pipeline end 12A and the piston extension end 20A, and (2) the pipeline end 12B and the piston extension end 20B. When the stab fittings 210A and 210B are used in conjunction with the repair fitting 10, a fluid sealed connection is provided between the pipeline ends 12A and 12B.

Figure 3:
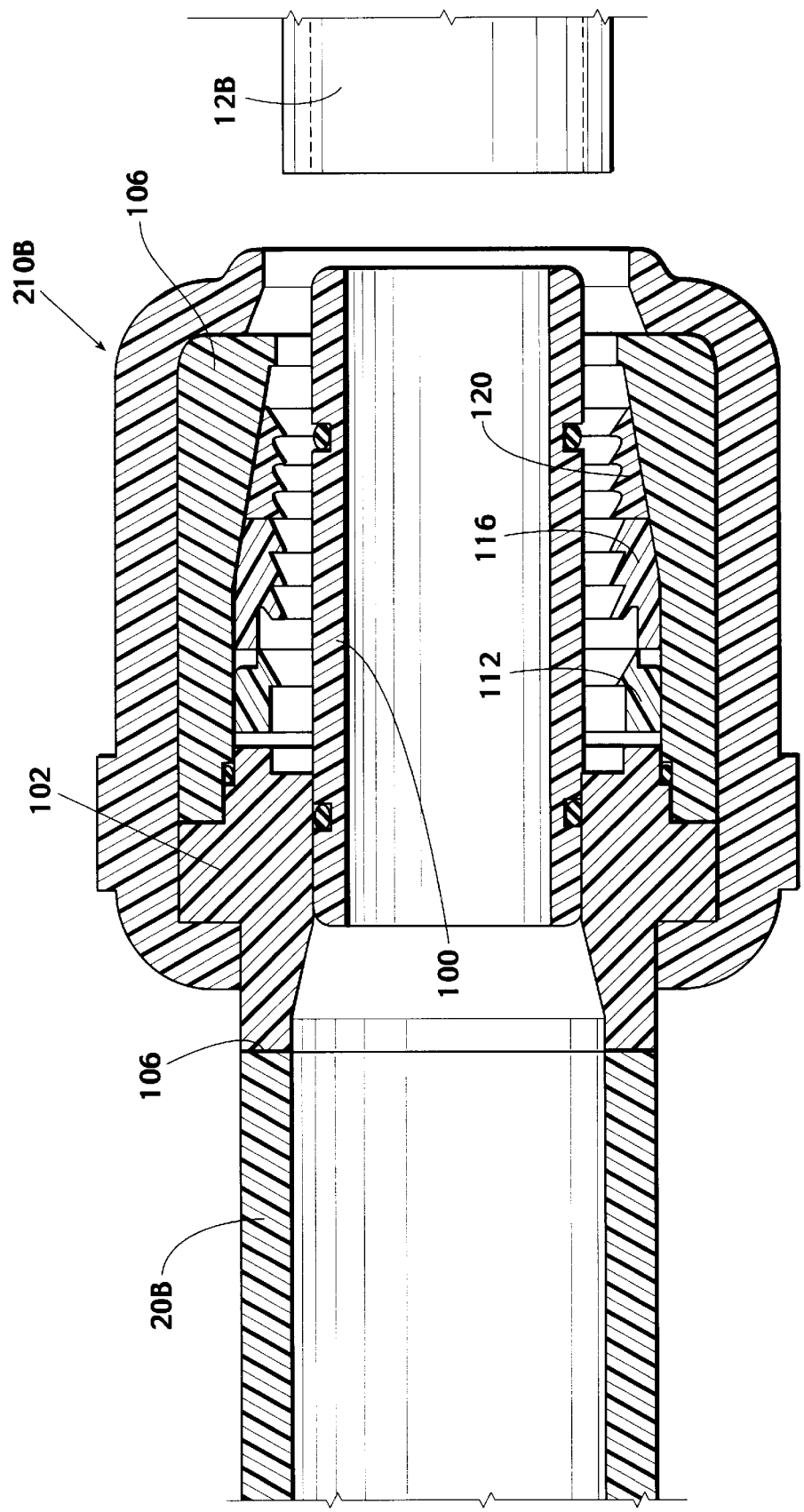
FIG. 3 is an exploded view of the stab fitting shown in FIG. 2.

FIG. 3 illustrates an enlarged sectional view of the connection with pipeline 12B. Piston extension end 20B is connected with stab fitting 210B by fusion joint 106. Pipeline end 12B is secured in fitting 210A. The stab fitting 210B shown in FIG. 3 is the stab fitting disclosed in U.S. Pat. No. 5,692,785 and in co-pending application Ser. No. 08/784, 499, now U.S. Pat. No. 5,791,698, which are incorporated herein by reference.

A straight tubular stiffener 100 extends through the entire length of the coupler fitting 210B. Tubular stiffener 100 has an external diameter slightly smaller than the internal diameter of plastic pipes 12B to permit the pipe to be pushed over the stiffener. Extending outward radially from the body of the stiffener 100 is a radial hub portion 102.

A protective outer body 110 surrounds the shell 104 and hub 102 106 and serves to hold the shell and hub in position. Adjacent the hub portion 102 is torodial follower 112. Adjacent the follower 112 is front boot seal 116. Adjacent the seal 116 is hollow gripper 120.

Figure 4:
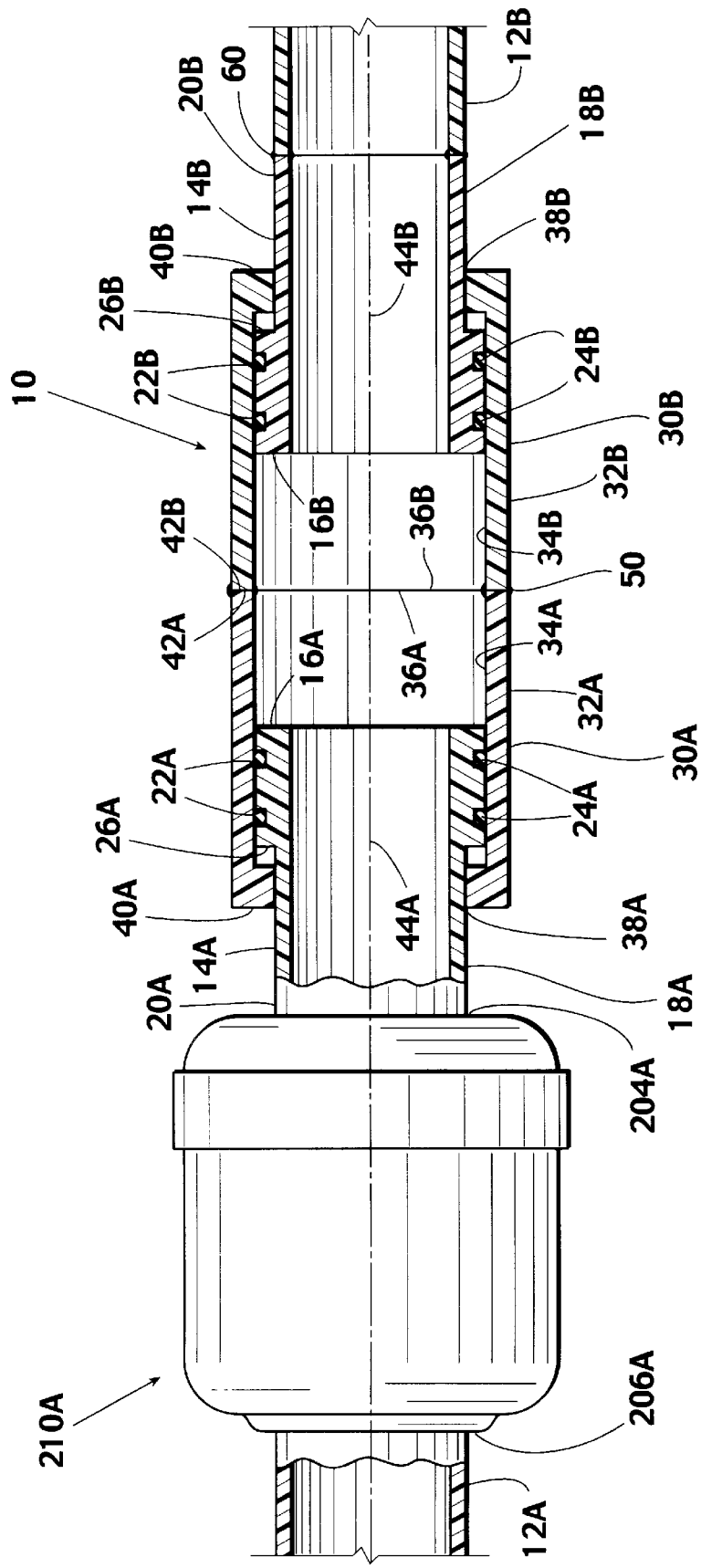
FIG. 4 is a cross-sectional elevational view of a plastic pipe repair fitting, with the repair fitting connected to the pipeline ends by one fusion joint and one stab fitting.

In the embodiment illustrated in FIG. 4, the first piston extension end 20A is sealably connected to first pipeline end 12A by stab fitting 210A, as described above for FIG. 3. The second piston extension end 20B is sealably connected to second pipeline end 12B by a piston extension end-pipeline end fusion joint 60. To install, the fitting is inserted between the ends coaxial therewith. The fusion joint 60 may be formed a number of ways. In the preferred butt fusion process, a heating element is brought in contact with the faces of the piston end 20B and pipeline end 12B. Alternatively, an electrofusion joint may be formed by: (1) butting the second extension end 20B to second pipeline end 12B; and (2) heating the circumferential intersection of the second extension end 20B and the second pipeline end 12B until a fusion joint is formed.

Figure 5:
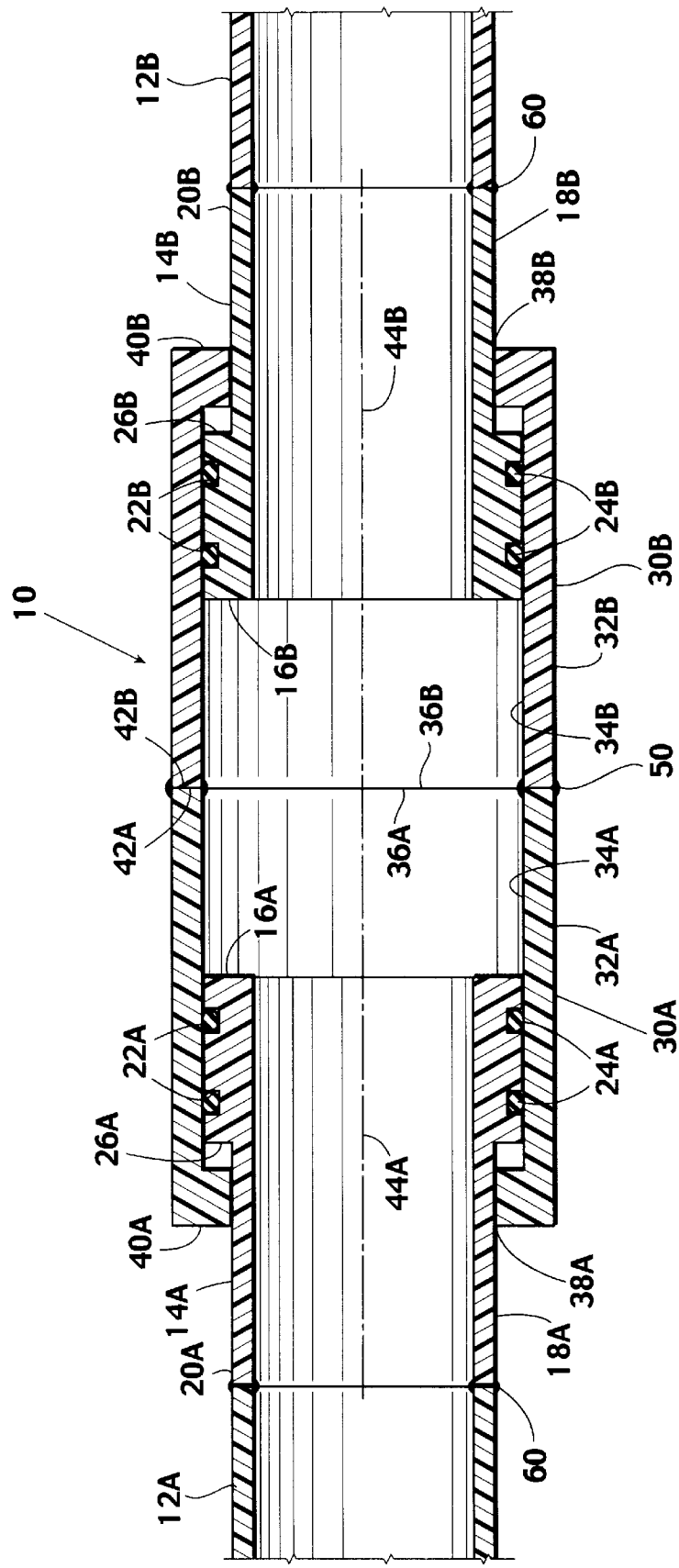
FIG. 5 is a cross-sectional elevational view of a plastic pipe repair fitting, with the repair fitting connected to the pipeline ends by two fusion joints.

In FIG. 5, both piston extension ends 20A and 20B are sealably connected to pipeline ends 12A and 12B by fusion joints 60. Once the damaged portion of the pipeline has been removed, the repair fitting 10 is inserted and the ends are butt fused to the pipeline ends.

Figure 6:
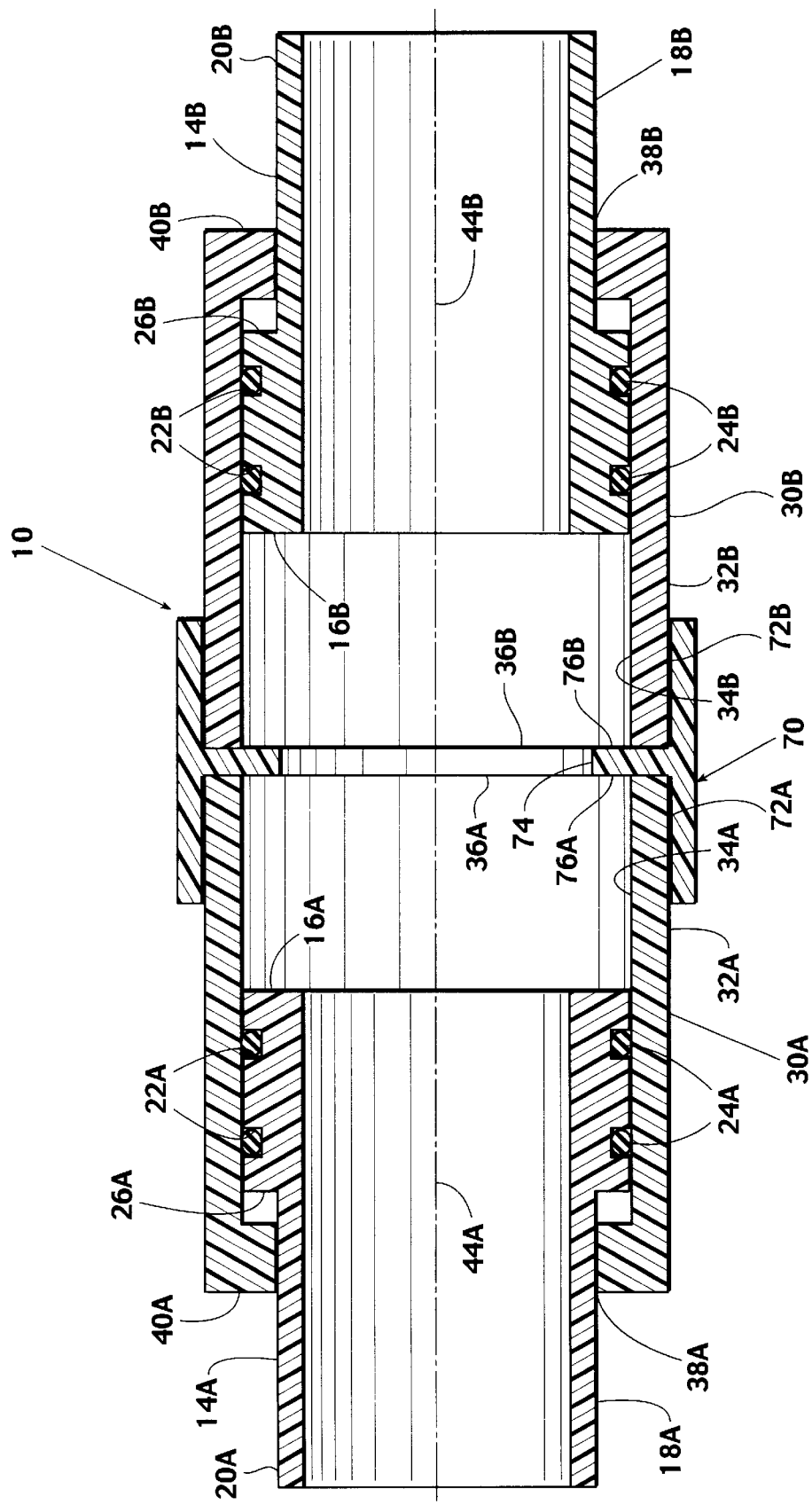
FIG. 6 is a cross-sectional elevational view of a plastic pipe repair fitting, with a cylindrical hub to connect the repair fitting cylinders.

In FIG. 6, an alternate embodiment is shown for repair fitting 10, in which the cylinders 30A and 30B of the fitting are sealably connected using a cylindrical hub 70. The diameter of the hub inner walls 72A and 72B is slightly larger than the diameter of the cylinder outer walls 32A and 32B. The hub inner wall 72B has the same diameter as the hub inner wall 72A. The cylinder outer wall 32A has the same diameter as the cylinder outer wall 32B.

Referring still to FIG. 6, after the O-rings 24A and 24B have been placed in the O-ring grooves 22A and 22B, the piston extensions 18A and 18B are placed through the cylinder bottom openings 38A and 38B. Cylinders 30A and 30B are slid into the opening formed by the hub inner wall 72, until cylinder top rim 42A abuts hub center wall first side 76A and until cylinder top rim 42B abuts hub center wall second side 76B. Glue is then applied along the outer circumference of the cylindrical hub 70 until the hub inner wall 72 is fused with a portion of the cylinder outer walls 32A and 32B. A fluid tight seal is created with a rigid body.

All materials used in the repair fitting 10 may be made from plastic, except for the O-rings.

FIG. 7 illustrates a further alternate embodiment of the repair fitting of the present invention. Each piston end 20A and 20B is connected by an electrofusion joint 140 and 142. The piston extension 20A and 20B is butted up against the pipeline ends 12A and 12B such that the center lines or axis are aligned. The electrofusion joints 140 and 142 contain conductors 144 (seen in the sectional view) which is supplied with electrical energy through leads 146. Accordingly, the electrofusion joints 140 and 142 cause the piston ends and the pipeline ends to heat so that the outer circumferences form a fluid tight joint.

FIG. 8 shows a further alternate embodiment of the plastic pipe repair fitting. Each piston end 20A and 20B will be joined with a pipeline end 12A and 12B, respectively, by fluid joints 150 and 152.

The piston extensions 20A and 20B are butted together and brought into alignment with the pipeline ends 12A and 12B. Glue or other adhesive is applied between the joint 150 and pipeline end 12B and between joint 152 and pipeline end 12B. A fluid tight seal is thus created.

Whereas, the present invention has been described in relation to the drawings attached hereto, it should be understood that other and further modifications, apart from those shown or suggested herein, may be made within the spirit and scope of this invention.

What is claimed is:

1. A repair fitting and connection apparatus for use with a plastic pipeline, comprising:
   (a) a first and a second piston, each said piston having a hollow piston head, a hollow extension and at least one O-ring groove in each piston head;
   (b) a first and a second cylinder, wherein said first piston head is slidable in said first cylinder and said second piston head is slidable in said second cylinder;
   (c) each of said cylinders having a top opening, a bottom opening, a top rim, a bottom shoulder, an inner wall and an outer wall;
   (d) resilient O-rings, wherein said O-rings are positioned in said O-ring grooves in said piston head to seal gaps between said cylinder inner walls and said piston heads;
   (e) a fluid-tight joint between said top rim of said first cylinder and said top rim of second cylinder, said joint being formed with said pistons positioned in said cylinders, including a cylindrical hub, having an inner wall and a center wall with a first and a second side, wherein said hub inner wall is slightly larger than said cylinder outer walls, so that said hub fits tightly on said cylinder outer walls, wherein said first cylinder slides into the opening formed by said hub inner wall until it abuts said hub center wall first side, wherein said second cylinder slides into the opening formed by said hub inner wall until it abuts said hub center wall second side, wherein said hub inner wall is glued to said first cylinder outer wall and said second cylinder outer wall; and
   (f) joints for coupling said piston extensions to ends of a plastic pipeline.

2. A repair fitting and connection apparatus for use with a plastic pipeline, comprising:
   (a) a first and a second piston, each said piston having a hollow piston head, a hollow extension and at least one O-ring groove in each piston head;

(b) a first and a second cylinder, wherein said first piston head is slidable in said first cylinder and said second piston head is slidable in said second cylinder, each of said cylinders having a top opening, a bottom opening, a top rim, a bottom shoulder, an inner wall and an outer wall;

(c) resilient O-rings, wherein said O-rings are positioned in said O-ring grooves in said piston head to seal gaps between said cylinder inner walls and said piston heads;

(d) a fluid-tight joint between said top rim of said first cylinder and said top rim of said second cylinder, said joint being formed with said pistons positioned in said cylinders, including a cylindrical hub, having an inner wall and a center wall with a first and a second side, wherein said hub inner wall is slightly larger than said cylinder outer walls, so that said hub fits tightly on said cylinder outer walls, wherein said first cylinder slides into the opening formed by said hub inner wall until it abuts said hub center wall first side, wherein said second cylinder slides into the opening formed by said hub inner wall until it abuts said hub center wall second side, and wherein said hub inner wall is glued to said first cylinder outer wall and said second cylinder outer wall; and (e) stab fittings to couple said piston extensions to ends of the plastic pipeline.

3. A repair fitting and connection apparatus for use with a plastic pipeline, comprising:

(a) a first and a second piston, each said piston having a hollow piston head, a hollow extension and at least one O-ring groove in each piston head;

(b) a first and a second cylinder, wherein said first piston head is slidable in said first cylinder and said second piston head is slidable in said second cylinder, each of said cylinders having a top opening, a bottom opening, a top rim, a bottom shoulder, an inner wall and an outer wall;

(c) resilient O-rings, wherein said O-rings are positioned in said O-ring grooves in said piston head to seal gaps between said cylinder inner walls and said piston heads;

(d) a fluid-tight joint between said top rim of said first cylinder and said top rim of said second cylinder, said joint being formed with said pistons positioned in said cylinders; and (e) stab fittings to couple said piston extensions to ends of the plastic pipeline, wherein each said stab fitting includes a rigid stiffener tube in a hollow coupling shell and a toroidal elastomeric seal received on said stiffener tube to engage the internal surface of said plastic pipe.

4. A method for making a repair fitting, comprising:

(a) providing a first and second piston, each of said pistons having a hollow head and a hollow extension, and each of said piston heads having a top, a bottom, and O-ring grooves;

(b) placing resilient O-rings in said O-ring grooves;

(c) providing a first and a second cylinder, each cylinder having a top opening, a bottom opening, a shoulder, a top rim, an inner wall and an outer wall wherein each said piston head has a diameter larger than said shoulder;

(d) inserting each piston into said top opening of each of said cylinders, extension first, and passing said extension through said bottom opening of each of said cylinders, until said bottom of said piston head abuts said cylinder shoulder; and (e) forming a fluid-tight joint between said first cylinder top rim and said second cylinder top rim.

5. The method of making a repair fitting of claim 4 wherein said step of forming a fluid-tight joint between said first cylinder top rim and said second cylinder top rim comprises:

(a) abutting said first cylinder top rim and said second cylinder top rim against a heater;

(b) applying heat to the entire faces of said abutting top rims;

(c) removing said heat, bringing said faces of said abutting top rims together, and applying force; and (d) allowing said first and second top rims to cool before applying any stresses.

* * * * *